United States Patent [19]

Trainor et al.

[11] 4,244,994
[45] Jan. 13, 1981

[54] LAMINATED ARAMID FIBER FRICTION MEMBERS

[75] Inventors: James T. Trainor, Huntington; Stanley F. Covaleski, Milford, both of Conn.

[73] Assignee: Raybestos-Manhattan, Inc., Stratford, Conn.

[21] Appl. No.: 50,597

[22] Filed: Jun. 21, 1979

[51] Int. Cl.² ............... D04H 3/02; D04H 3/07; B32B 31/04
[52] U.S. Cl. ............... 428/37; 188/251 A; 192/107 M; 156/169; 156/176; 156/180; 156/182; 156/190; 156/191; 156/242; 156/243; 428/64; 428/65; 428/227; 428/245; 428/253; 428/257; 428/298; 428/299; 428/902; 428/138; 428/302

[58] Field of Search ............... 428/37, 64, 65, 245, 428/257, 253, 285, 287, 290, 298, 302, 901, 902, 299; 192/107 M; 188/251 A, 251 R; 156/166, 169, 176, 180, 182, 190, 191, 242, 243

[56] References Cited

U.S. PATENT DOCUMENTS

| | | | |
|---|---|---|---|
| 3,094,511 | 6/1963 | Hill et al. | 260/32.6 R |
| 3,365,041 | 1/1968 | Stormfeltz | 192/107 M |
| 3,556,922 | 1/1971 | Green et al. | 428/902 |
| 3,713,934 | 1/1973 | Morton | 428/257 |
| 3,927,241 | 12/1975 | Augustin | 428/65 |
| 4,045,608 | 8/1977 | Todd | 428/65 |
| 4,118,528 | 10/1978 | Lowry | 428/65 |

Primary Examiner—James J. Bell
Attorney, Agent, or Firm—Howson and Howson

[57] ABSTRACT

A laminated friction member, such as a clutch facing comprising a friction element comprising aramid fibers and a reinforcing element formed of non-aramid fibers, the elements being impregnated with and bonded together by means of heat-curable cement.

53 Claims, 5 Drawing Figures

LAMINATED ARAMID FIBER FRICTION MEMBERS

The present invention relates to friction members such as clutch facings and disc brake pads and to the method of making such members using aramid fibers as the friction material.

BACKGROUND OF THE INVENTION

The automotive industry is ever in search of improved friction materials for use in automobiles, trucks, and other motor vehicles. One particular area where improved friction materials have been sought is in the design and fabrication of clutch facings. Criteria of particular importance in clutch facing design are a burst strength adequate to meet ever higher rotational speeds of vehicle drive chains, an adequate coefficient of friction, and reduction in wear to increase the useful life of clutches.

Major manufacturers of automotive clutch facings require that clutch facings meet a particular performance standard in the hot burst strength test. In this test, the driven member of the clutch, with two facings attached, is heated to 500° F. for 15 minutes and then be subjected to spin testing as a prerequisite to product acceptance. This test is one of the most difficult tests to be passed by a clutch facing since at elevated temperatures fibrous materials and the binder comprising resin and/or rubber of which the clutch facing is formed lose strength, resulting in bursts at relatively low rotational speeds. Conventional clutch facings formed of asbestos fibers having an OD of 11 inches and an ID of 6½ inches are known to withstand spin speeds of about 8,000 to 9,000 r.p.m. in the hot burst strength test.

As spin requirements for clutch facings have become more demanding, glass fibers have been used to strengthen the facings while asbestos has been retained as the friction material.

More recently, in an effort to improve hot burst strength, clutch facings have been formed from bundles of parallel continuous glass filaments spirally or randomly wound upon themselves in the form of an annular disc and impregnated with heat-curable cement. Such constructions are described in U.S. Pat. Nos. 3,743,069 and 3,756,910.

According to U.S. Pat. No. 4,130,537, glass, as the active friction ingredient of a friction element, is too "aggressive" for most commercial applications, the aggressiveness being manifested during use by noise, vibration and/or erratic friction effects when the friction element is engaged with a mating surface. In order to overcome this shortcoming, the patent teaches the inclusion of infusible organic fibers having a decomposition temperature above 400° F. but below 800° F. Aramid fibers sold by duPont under the name Nomex are given as an example of such fibers.

Conventional clutch facings formed of asbestos fibers, although having adequate friction properties, e.g. a coefficient of friction of from about 0.22 to about 0.44, in addition to having limited hot burst strength, also exhibit a relatively high rate of wear on the order of about 0.01–0.012 inches for each 10,000 engagements. Although glass fiber clutch facings exhibit improved hot burst strength and somewhat reduced wear, as compared to asbestos fiber clutch facings; nevertheless, there continues to be a need for improvements in both of these essential properties.

According to copending application Ser. No. 050,596 filed June 21, 1979, disc-shaped clutch facings can be fabricated using aramid fibers as both the reinforcing and friction material. However, in fabricating such clutch facings certain problems were encountered. More particularly, the clutch facings were difficult to grind to acceptable tolerances and were resistant to drilling to provide holes by means of which the facings may be attached to the power train of an internal combustion engine. During grinding the heat generated was sufficient to ignite the resulting dust in the exhaust system, and the ground facings had an unsightly fuzzy surface. By grinding the facings under water spray the hazzard of fire was reduced, but the facings still had a fuzzy appearance. Similarly, the drilling of clean holes was most difficult whether the drilling operation was carried out under water spray or otherwise.

Another disadvantage of clutch facings in which the sole fibers present are aramid fibers is cost, since such fibers are considerably more expensive than fibers such as asbestos and glass fibers heretofore used in clutch facings.

It is an object of this invention to provide novel friction members, especially clutch facings, whose friction face comprises aramid fibers, which friction elements can be produced relatively inexpensively.

Another object of this invention is to provide a novel method for producing friction members comprising aramid fibers which overcomes the above-discussed problems heretofore encountered in fabricating friction facings from such fibers.

These and other objects of this invention will become apparent from the following detailed description of the invention and accompanying drawings in which.

DETAILED DESCRIPTION OF THE INVENTION

Figure 1:
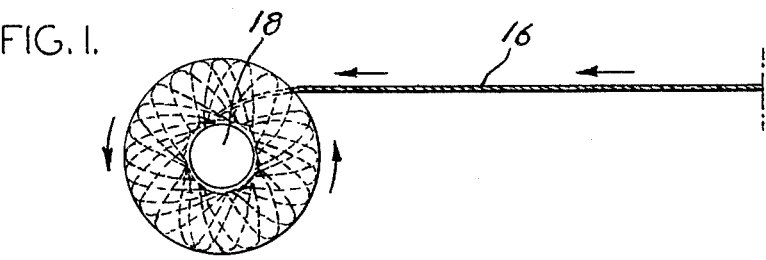
FIG. 1 represents a tape formed of either aramid or glass fibers impregnated with a heat-curable cement being wound upon itself in undulating fashion to produce a disc-shaped clutch facing preform.

This invention provides a novel friction facing in the form of a laminate of annular shape which is substantially free of warpage or coning, the laminae comprising a friction element formed of aramid fibers and a fibrous reinforcing element bonded together into a unitary structure by means of a heat-curable cement.

Referring to the drawings wherein is described a preferred form of a friction facing according to his invention, the reference numeral 10 indicates an annularly shaped disc-like friction element such as a clutch facing. The friction element consists of two plies integrally bonded together, ply 12 being a friction element, and ply 14 being a reinforcing element.

The friction element of the clutch facing is formed by wrapping continuous bundle or tape 16 of generally continuous aramid filaments coated with a heat-curable elastomer as described hereinbelow in undulating fashas shown in FIGS. 1 and 2, to form a disc-like preform. FIG. 1 shows schematically the method by which continuous tape 16 is wound in undulating manner into a revolving mandrel 18, whereby the tape constantly varies in the instantaneous radius at which it is being wound.

Figure 2:
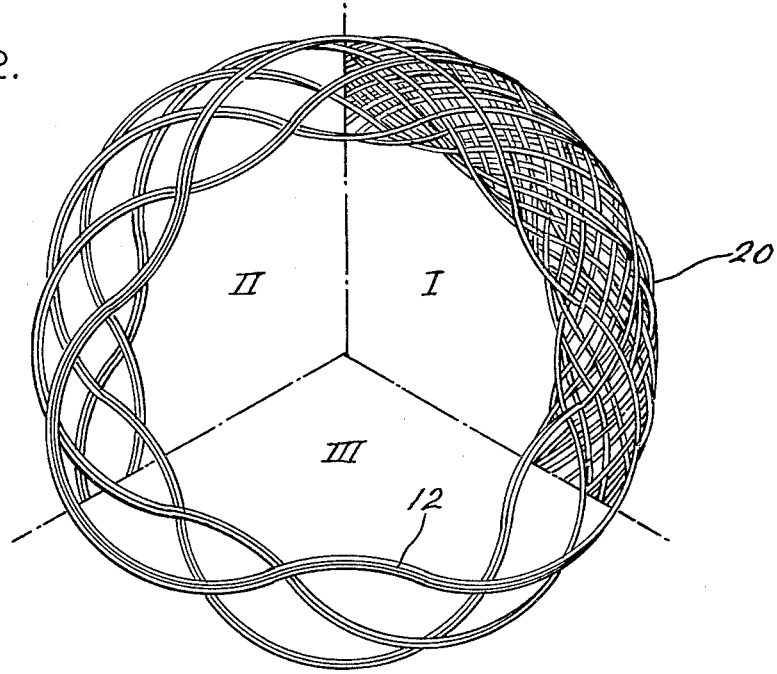
FIG. 2 shows a clutch facing preform of aramid or glass fibers impregnated with a heat-curable cement in three stages of the formation.

As particularly illustrated in FIG. 2, the clutch facing preform 20 is shown as having three segmens I, II, and III, which segments illustrate the complete clutch facing preform I, and the intermediate (II) and (III) stages of formation of the preform.

In similar fashion, the clutch facing reinforcing element 14 is formed by wrapping a continuous bundle or tape of substantially continuous glass fibers coated with a heat-curable cement in undulating fashion as shown in FIGS. 1 and 2 to obtain a disc-like preform, the various stages of its formation also being shown in FIG. 2. The heat-curable cement with which the tape of glass fibers is impregnated should be compatible with that employed to impregnate the tape of aramid fibers whereby the respective preforms can be bonded together to form an integral laminated clutch facing.

The preform for the friction element 12 and the preform for the reinforcing element 14 are superimposed and subjected the heat and pressure to consolidate the preforms and cure the cement to bond the preforms together. Following the molding step, the resulting facing may be subjected to further heat treatment to convert the cement into the infusible, insoluble state.

Figure 3:
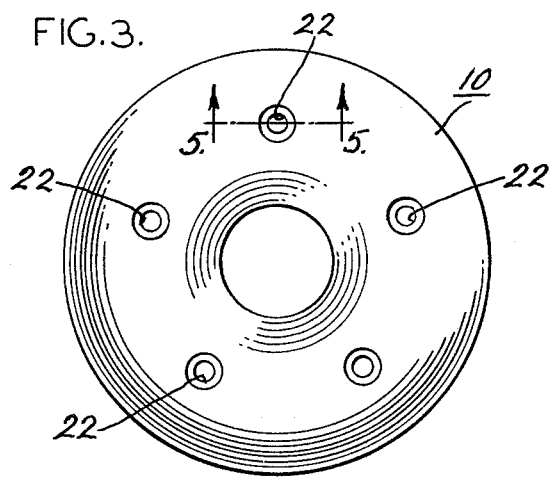
FIG. 3 is an elevation or face view of a clutch facing according to this invention.
Figure 4:
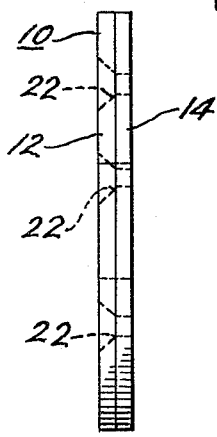
FIG. 4 is a side or edge view of the clutch facing shown in FIG. 3.

Preferably, the mold employed in the molding operation has a plurality of projections, each having a conical shoulder from which extends a cylindrical portion. The length of the projections should be such that during the molding operation, the projections enter the exposed surface of the friction element 12 and extend into, but not through the reinforcing element 14. After removal from the mold, and subsequent heat treatment to cure the cement fully, the exposed surface of the reinforcing element 14 is removed, as for example by grinding, to a depth sufficient to exposed the holes made by the projections, thereby providing holes 22 (FIGS. 3 and 4) by means of which the facing may be attached to the power train of an internal combustion engine.

The friction facings of this invention provide a number of unexpected advantages inasmuch as it was thought that by reason of the different coefficients of thermal expansion of aramid fibers and the backing fibers, e.g. glass fibers, the laminate structure would warp or cone to such a degree as to render the facings unusable. However, it was discovered that such was not the case. Rather the friction facings were found to meet industry standards as regards warpage and coning. Thus, the fact that the fibers in the reinforcing layer may have a different coefficient of thermal expansion than the aramid fibers of the friction layer is not the criterion for rejecting the use of such backing fibers.

The friction facings, by reason of the friction element comprising aramid fibers, exhibit improved wear characteristics thereby giving them a considerably longer useful life. In addition, the reinforcing element, depending upon its structure and fibrous composition can enhance the hot burst strength to meet more demanding requirements. Further, the advantages of an aramid fiber friction facing. i.e. improved wear properties and adequate burst strength, are retained while considerable reductions in cost are effected due to the presence of much less expensive reinforcing fibers.

Of particular advantage is the fact that by the method of this invention, the problems of grinding and drilling aramid clutch facings is overcome. By providing holes through which the clutch facings may be attached to a clutch assembly by molding them into the friction element of aramid fibers and then removing a portion of the reinforcing element of glass or other suitable fibers to expose the holes, drilling and grinding of the aramid friction element is totally avoided. Thus, the surface of the friction element does not have a fuzzy appearance and the possible fire hazzard during grinding of the aramid fibers is obviated.

The aramid fibers used in the friction element of the friction facing of the present invention are commercially available in yarn form under the trademark "Kevlar". Aramid is a generic name for fibers made by reacting an aromatic diacid chloride with an aromatic diamine, the acid group of the diacid chloride and the amine groups of the diamine being meta or para oriented relative to eachother at low temperatures (below 100° C.). The aramid polymers of which the fibers are made are of high molecular weight and are characterized predominantly by the recurring structural unit:

wherein $R_1$ is hydrogen or lower alkyl and wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substitutents attached to any aromatic nucleus being one or more or a mixture of lower alkyl, lower alkoxy, halogen, nitro, lower carbalkoxy, or other groups which do not form a polyamide during polymerization.

Aramid polymers of the type of which the fibers used in the friction compositions of this invention are made are described in considerable detail in U.S. Pat. No. 3,094,511, and the disclosure of that patent is incorporated herein by reference. Such aramid fibers should have a decomposition temperature of at least about 850° F., preferably above about 900° F.

Particularly preferred aramid fibers which may be used in the friction element of the friction facings of this invention are formed of polymers which are the condensation product of terephthalic acid and p-phenylenediamine. An example of fibers of this type are those having a decomposition temperature generally on the order of about 930° F., a density of 1.44 g./cm.$^3$, a fiber diameter of about 0.0005 inches, a tenacity of about 21 grams/denier, and a tensile strength of about 400,000 psi.

Depending upon the particular properties desired for the friction element, the aramid fibers may be continuous filaments, staple fibers or chopped fibers, the latter being of relatively uniform length of from about $\frac{1}{8}$" to 2" in length. If desired the chopped fibers may also be crimped. For example, in clutch facings made according to the invention the use of aramid yarn composed of continuous filaments is preferred. On the other hand staple or chopped fibers, which are less expensive may be used in place of continuous fibers to effect cost reductions.

A "yarn" as used in this specification and claims refers to a collection or assembly of either substantially continuous aramid filaments, as well as staple, or chopped fibers. In the case of the former, a yarn may include from 100 up to 2000, preferably 1500 to 2000 individual substantially parallel filaments gathered together in any manner well known in the art. Yarns formed of staple fibers will generally be from about 500 to about 10,000 denier, preferably from about 4000 to about 6000. In either case the filaments of which the yarns are formed are extremely fine, an example being about 0.0005 inches. Yarn comprised of substantially continuous filaments ordinarily will be free of twist. Yarn formed of staple fibers will have sufficient twist to hold the fiber bundle together.

In addition to aramid fibers, the friction element 12 of the friction facing of this invention includes a heat-curable cement composition comprising heat-hardenable resin, vulcanizable elastomer, and friction modifers.

The heat-hardenable or thermosetting resin may be of the phenolic type, such as the phenol aldehydes, examples of which are phenol formaldehyde, resorcenal formaldehyde, phenol-cresol formaldehyde and phenol furfural resins. If desired, such resins may have been rendered oil-soluble by reaction with linseed or cashew nut oil. A preferred phenolic resin is phenol formaldehyde resin. Other suitable thermosetting resins include epoxy resins, epoxidized phenolic resins, melamine formaldehyde resins, and the like.

The vulcanizable elastomer in the cement may be natural rubber or a synthetic elastomer such as polychloroprene, butadiene-styrene, butadiene-acrylonitrile, isoprene, acrylate rubber, the more recently developed hydrocarbon elastomers comprising a copolymer of ethylene, propylene and a third monomer, such as dicylopentadiene, which provides unsaturation for curing, and the like, and especially those elastomeric materials which are curable or vulcanizable by reaction to a set stage by peroxide or through sulfur linkages. The elastomer-containing cement, of course, will also include well known vulcanizing and stabilizing agents.

The cement composition preferably contains conventional friction modifiers which ordinarily comprise particulate inorganic materials such as clay, silica, alumina, cryolite, litharge and barytes, or organic materials, such as graphite, carbon black and particles formed of polymerized cashew nut oil.

Typical cement compositions particularly suitable for bonding the aramid fibers of the friction element 12 according to this invention are as given in Table I, below:

TABLE I

| Constituent | Parts By Weight |
| --- | --- |
| Vulcanizable elastomer | 5-15 |
| Thermosetting Resin | 5-25 |
| Accelerator | 0.05-0.5 |
| Curing Agent | 1-12 |
| Particulate Friction Modifiers | 10-50 |

The cement composition generally will contain from about 20 to about 80 percent vulcanizable elastomer solids and from about 80 to about 20 percent of heat-hardenable resin solids, based on the combined weight of the two. Preferably, the cement contains equal parts by weight of resin and elastomer.

The cement may be applied to the aramid fibers in the form of a solvent base mixture. Suitable solvents include toluene and other well known volatile organic solvents which are relatively non-toxic.

The proportions of aramid fibers and heat-hardenable cement used in the friction element of the friction facings of this invention will depend upon the performance characteristics desired for the facings. The heat-hardenable cement may comprise from about 40 to about 95 percent, by weight, (dry basis), based on the total weight of cement and fibers. Preferably, the heat-hardenable cement comprises from about 60 to about 80 percent.

In the friction element of the friction facings of this invention, a portion, for example up to about 30 percent, by weight, of the aramid fibers may be replaced by other non-aramid fibers, both organic and inorganic, examples of which are cotton, jute, hemp, nylon, rayon, glass and asbestos fibers.

Again referring to a preferred embodiment, a tape 12 is formed by combining a plurality of, generally 2 to 15, and preferably 5 to 10, yarns comprising aramid filaments or fibers.

The aramid fibers may be coated with heat-hardenable cement by any suitable means. In the case of yarns formed of substantially continuous filaments, preferably, the coating means is such as to splay or open up the fiber bundles to provide an opportunity for the cement dispersion to penetrate into the fiber bundle more easily so that all of the filaments are contacted by the cement and pick up cement solids along their length.

There are various devices in the textile field which are designed to splay or separate bundles of fibers to enhance pick up of various coating materials. For example, the yarns may be passed through a comb-like device before they enter the coater, which generally is of the roller type, whereby the fiber bundles are opened up for intimate contact with the coating composition.

Following coating of the fibers with cement, the fibers, in the form of a yarn, are dried by being passed through an oven, such as a hot air circulating oven or one equipped with infra red heating means.

Preferably, the fibers are given a precoat of a phenolic resin, e.g. a phenol formaldehyde resin, prior to being coated with heat-hardenable cememt. This may be accomplished by passing the yarn bundles through an alcohol/water solution of the phenolic resin. Such solutions may contain on the order of about 10 to 12% resin solids, and the proportions by weight of alcohol to water in such solutions may vary from about 60:40 to about 40:60, a 50:50 mixture being preferred. Using such solutions the resin pick-up by the aramid fibers will be on the order of about 10–12% based on the combined weight of resin and fibers.

Following application of the heat-curable cement to the fibers and removal of solvent, the yarns are combined to form a tape by gathering together a plurality of yarns, e.g. 2 to 10, by rotating rollers or the like which twist the yarns together. In the resulting tape there may be a small amount of twist.

As noted above, a tape formed of aramid fibers, either continuous or staple, and coated with heat-hardenable cement is wound preferably in undulating fashion onto a revolving mandrel in such manner that the convolutions of the tape vary in the instantaneous radius at which they are being wound. This arrangement is best illustrated in FIG. 2 of the drawings. However, the tape may be spirally rather than randomly wound to form an annular friction facing preform.

In forming the friction element 12, rather than employing a tape comprised of aramid yarn, the tape may be in the form of a knitted structure or a woven fabric. For example a suitable tape may be obtained by wrapping a woven fabric containing aramid fibers around a mandrel and slitting the fabric into strips of suitable width, e.g. ½ to ⅝ inches in width. A knitted tape may also be prepared using aramid fibers in warp and fill with a catch thread of nylon, polyester or other organic fiber to stabilize the tape. Such tapes are then coated with heat-curable cement, dried and wound in spiral or undulating form to obtain a friction element preform.

In an alternative and less preferred embodiment of this invention, the friction element 12 may be formed from a moldable composition comprising aramid fibers, heat-curable cement including friction modifiers, and an organic solvent in an amount sufficient to render the mixture plastic and moldable. The constituents are wet-mixed in any suitable blender, and the resulting wet mix, after reduction in volatile constituents to about 4-6 percent, is placed in annular molds where the mixture is subjected to heat and pressure. The preforms so produced may then be stored until such time as they are combined with annular reinforcing elements and the superimposed elements are subjected to further heat and pressure treatment in a suitable mold to bond the preforms together, after which the friction facings so produced may be post-cured by heating at temperatures on the order of 400° to 450° F. for several hours.

In such molding compositions, the proportions of aramid fibers and heat-curable cement generally will conform to those used in making friction elements from fibrous tapes as hereinabove described. Also, the composition of the heat-curable cement may conform to that used in impregnating the fibrous tapes.

A further embodiment of this invention is the production of laminated disc brake pads and brake linings having a friction element such as that obtained by molding to the desired configuration a moldable mix as described hereinabove and laminating the friction element so formed under heat and pressure to a reinforcing element of the type hereinbelow described. By so doing, the cost of such friction elements based on aramid fibers may be significantly reduced and the holes in the friction surface of aramid may be molded therein, thereby avoiding the difficulties of grinding and drilling the aramid fiber surface.

According to a preferred form of this invention, the reinforcing element 14 of the friction facing, as stated previously, is composed of glass fibers bonded together with a heat-curable cement.

As used in this specification and appended claims, a "filament" or "fiber" of glass is meant to define a substantially continuous individual fiber of glass having a considerable uninterrupted length, e.g. several thousand feet. A "roving" refers to a collection or assembly of a great number of substantially parallel individual glass filaments. Thus, a roving may include from 100 up to 2000, preferably 1500 to 2000 individual filaments gathered together in any manner well known in the art and technology of glass fiber manufacture. The rovings ordinarily will be free of twist, but may have a relatively small amount of twist not exceeding about one turn per foot. The filaments of which the rovings are formed are extremely fine having diameters ranging from about 10 to 15 microns. Preferably the diameter of the filaments is on the order of 12 to 14 microns.

It is desirable that the glass filaments be first treated in such manner as to enable them to form a strong and permanent bond with the below described cement. This can be accomplished by application of one or more anchoring agents to the filaments just after they are formed.

A suitable anchoring agent is represented by the amino silanes such as gamma-aminopropyltriethoxy silane or by a similar silane having a carboxyl group in the organic group attached to the silicon atom or an amino or carboxyl group in the carboxylato group of a coordination compound. These may be applied to the glass filament surfaces or incorporated as a component of a size composition. The use of such silanes as anchoring agents is disclosed in U.S. Pat. No. 3,287,204 issued Nov. 22, 1966.

Another treatment to obtain enhanced bonding of the cement to glass filaments involves the application thereto of an aqueous solution of magnesium chloride, zinc chloride, or magnesium hydroxide or zinc hydroxide. After application is made in the form of the chloride, the solution in aqueous medium may be adjusted to an alkaline pH to effect deposition on the glass filaments in the form of the hydroxide. The hydroxides are then converted to the corresponding oxides by heat treatment. This method is described in U.S. Pat. No. 3,311,528 issued Mar. 28, 1967.

The glass filaments or fibers may also be rendered receptive to forming a strong bond with the cement by treating the glass fibers with a size having as an essential ingredient, the reaction product of an imidazoline having a long chain fatty acid group containing at least 5 carbon atoms and an unsaturated polyester resin formed in an uncured state as disclosed in U.S. Pat. No. 3,097,963 issued July 16, 1963.

Other suitable procedures for rendering glass filaments receptive to forming a strong bond with the cement involve the use of a chromic coordination compound having a carboxylate group coordinates with a trivalent nuclear chromium atom in which the carboxylate group is of less than 6 carbon atoms and contains a highly functional group (U.S. Pat. No. 3,552,910), the use of a silane, its hydrolysis products or its polymerization products having at least one of the organic groups attached to the silicon atom containing less than 7 carbon atoms and having been formed with ethylenic unsaturation (U.S. Pat. No. 2,562,288), the use of a silane-organic polymeric compound having film forming properties (U.S. Pat. No. 3,169,884); and the use of a size consisting of an organo silicon compound in the form of a silane, a water dispersible polyvinyl pyrrolidine, gelatin, and a water dispersible polyester resin (U.S. Pat. No. 3,207,623).

This invention is not limited to any specific treatment of the glass filaments, provided the treatment provides the glass filament surfaces with the ability to form a strong bond with the heat-curable cement.

As with the aramid yarn, the glass fiber rovings are coated with a heat-curable cement, the coating operation being such as to enable the cement to enter into and coat uniformly the fibers of the roving, splaying of the fiber bundle to accomplish such purpose being effected as described hereinabove with respect to coating of the aramid fibers.

The coating step should be such as to enable the rovings to pick up from about 55 to about 75 percent cement (dry basis), based on the weight of coated fibers.

The cement used to coat the glass fibers need not be identical with that used to coat the aramid fibers. However, the respective cement compositions should be compatible in the sense that when the friction element and reinforcing element preforms are superimposed and subjected to heat and pressure, the respective preforms are bonded together to form a strong unitary friction facing. A suitable cement for coating the glass fibers has the composition given in Table I, above.

The rovings to which the heat-curable cement has been applied and subsequently dried, as for example by being passed through a hot air oven, are combined to form a tape by gathering a plurality of rovings, e.g. 2 to 15, by rotating rollers or the like which twist the rovings together. In the resulting tape there will ordinarily be a small amount of twist.

If desired, the tape used to form the friction element and/or the reinforcing element may be provided along its length with one or more helices of non-ferrous metal wire, e.g. brass, copper or lead wire, or of non-metallic material such as cotton, rayon or glass fiber yarn or thread. Such helices may be applied to the tape in the manner disclosed in U.S. Pat. No. 3,756,910 or in other suitable manner as by braiding.

The reinforcing member can also be formed of a knitted tape, or a tape formed of a woven fabric which is cut in strips to the desired width. In the fabric, the warp threads may comprise continuous glass filaments and the fill threads may be of any suitable material including metal, e.g. copper.

As noted above, the tape formed of continuous glass filaments and impregnated with the heat-curable cement system is wound, preferably in undulating fashion onto a revolving mandrel in such manner that the convolutions of the type vary in the instantaneous radius at which they are wound. This arrangement is best illustrated in FIG. 2 of the drawings. However, if desired the tape may also be spirally wound rather than randomly wound to form the reinforcing element.

Rather than fabricating the reinforcing element from a randomly or spirally wound tape, the reinforcing element may comprise a flat sheet of woven or nonwoven fibrous material, e.g. cotton, fiberglass or the like, cut so as to be coextensive with the friction element. However, the choice of sheet material should be such as to provide a friction facing which is essentially free of warpage and, in the case of annular clutch facings, also coning.

In forming the friction facings of the invention, a friction element preform and a reinforcing element preform are combined, and the resulting sandwich construction is placed in a mold and heated at elevated temperatures in the range of about 350° to 375° F., under a pressure of about 3500 to 5000 psi for a short period of time, e.g. 2-3 minutes to consolidate and densify the preform and at least partially cure the binder. Subsequently, the resulting facings are placed in an oven heated to a temperature of about 400° to 450° F. where they remain for several hours. During this latter heat treatment the cement is converted into the infusible, insoluble state.

Figure 5:
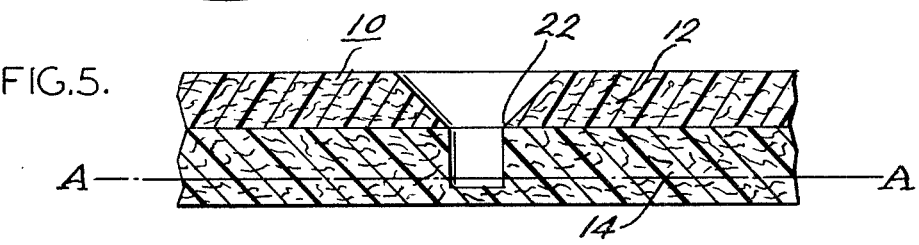
FIG. 5 is a fragmentary sectional view of the clutch facing of FIG. 3 taken along the line 5—5 prior to grinding of the glass fiber reinforcing layer.

According to a preferred embodiment of the invention, the mold, whether for clutch facings, disc brake pads or brake linings, in which the superimposed preforms are consolidated and bonded together, contains a plurality of pins or projections having a conical shoulder from which extends a cylindrical portion. When the mold is closed to bond the preforms into a unitary structure, the pins enter the exposed surface of the friction element 12 and extend through such element into, but not through, the reinforcing element 14. Referring to FIG. 5, after appropriate post-molding heat treatment as previously described, a portion of the surface of the reinforcing element comprising glass fibers for example is removed, as by grinding, to such distance as to expose the holes made by the pins (see line A—A of FIG. 5). The friction facing is now ready to be attached to the particular automotive assembly, for which it was designed, in this case a clutch assembly, by rivets through the holes 22. Such procedure advantageously avoids grinding and drilling of the friction element 12 composed of aramid fibers.

The invention is further described by the following examples.

EXAMPLE 1

This example describes the preparation of a clutch facing having a friction face comprising aramid fibers and a glass fiber reinforcing backing.

A 2/1 cc spun cotton, aramid yarn, was coated with a water soluble, heat curable, phenol formaldehyde resin by passing the yarn through 50:50 alcohol/water solution containing about 10% resin solids. The resin pick-up was such as to achieve a coating of 10 weight percent resin, based on the combined weight of resin and yarn, after drying.

The dried precoated yarn was then coated with a solvent based heat-curable cement of the composition set forth in Table II, below:

TABLE II

| Constituent | Weight Percent |
|---|---|
| Toluene | 54.0 |
| Natural rubber | 4.6 |
| Heat curable, phenol formaldehyde | 2.5 |
| Particulate friction modifiers | 34.6 |
| Tackifiers | .7 |
| Cure accelerator | .25 |
| Curing agent | 3.4 |

The cement was continuously applied to the yarn by passing the yarn through a dip tank and drying the coated yarn in a drying oven maintained at 115° F. Using this procedure, a 75 weight percent pickup of dried cement, based on the total weight of precoated yarn (25 weight percent precoated yarn/75 weight percent cement).

A tape was formed by gathering six of the coated yarns together as they exited from the drying oven, and the tape was wound on a rotating roll.

Sufficient of the coated aramid fiber tape required to form the preform for the friction element of a clutch facing (210 grams) was wound in undulating fashion onto a revolving madril in such manner that the convolutions of the tape varied in the instantaneous radius at which they were wound.

Similarly, a glass fiber roving was coated with the same cement to achieve a 68 weight percent coating on the glass roving which was also formed into a tape by combining six strands of the coated roving.

Two hundred and fifty grams of the coated glass roving were wound in the previously described undulating manner to prepare the reinforcing element preform required for a clutch facing.

The glass and aramid preforms were then superimposed and placed in a heated grooved clutch facing flash mold, containing pins for molding in rivet holes, with appropriate counter bore and thru hole, in the facing, which rivet holes are required for appropriate mounting of the facing to a driven member of a clutch assembly with the groove pattern on the aramid side of the molded clutch facing being exposed for friction contact.

The preforms were molded for 3 minutes at a temperature of 350° F. and a pressure of 4000 psi to densify and unite the preforms and effect partial cure of the cement. The resulting friction facing was subsequently post-cured at programmed temperatures ranging from 300° to 450° F. for a total of 5½ hours.

No significant warpage, coning, shrinkage, or other distortion from the molded laminated clutch facing was observed after curing. The surface of the glass fiber reinforcing layer was ground to a depth sufficient to expose the rivet holes, while the facing of aramid fibers was left unground. The dimensions of the final facing were: O.D. 11"; I.D. 6½"; thickness 0.137"±0.002."

EXAMPLE 2

A two layered laminated clutch facing prepared as described in Example 1 was subjected to a Controlled Torque Test using a Long Clutch Dynamometer. In this test, after carefully measuring the thickness of the facings at ten different places on the O.D. and I.D., the friction properties of the facing are measured as follows:

A. For each application the clutch is applied for 4 seconds at 1100 rpm, and a constant torque of 235 lb. ft., the clutch output torque is controlled by limiting the engagement of the clutch through means of the adjustment in the releasing mechanism. Adjustment can be made to achieve only an average value of output torque during the 4 second engagement.

B. The clutch is released for 56 seconds followed by reapplication.

C. After 100 applications, a 15 second hot fade test at full pressure is made.

D. Without cooling, the pressure is adjusted immediately to controlled torque of 235 lb. ft., and an additional 100 applications are made.

E. Another 15 second hot fade test at full pressure is made before proceeding, without cooling with an additional 100 applications.

F. A final 15 sec. hot fade at full pressure is made before concluding the test.

Table III sets forth the coefficient of friction data as the maximum and minimum values obtained during the first, second and third 15 sec. fades.

TABLE III

| Fade No. | Max. μ | Min. μ |
|---|---|---|
| 1 | .30 | .26 |
| 2 | .30 | .26 |
| 3 | .35 | .27 |

An unexpected and superior average wear of 0.001" during the total duration of the test was observed.

EXAMPLE 3

A laminated clutch facing having a friction member containing continuous filament aramid yarn, and a reinforcing member of glass roving was prepared according to the procedure of Example 1.

The coefficient of friction data for this clutch facing obtained from the Controlled Torque Test described in Example 2 are shown in Table IV.

TABLE IV

| Fade No. | Max. μ | Min. μ |
|---|---|---|
| 1 | .30 | .26 |
| 2 | .30 | .26 |
| 3 | .35 | .27 |

The average wear of the facing during the test was 0.007".

EXAMPLE 4

This example describes the preparation of a laminated clutch facing in which the friction element and reinforcing element preforms were prepared from a precoated and coated, knitted tape of aramid yarn, and from a tape obtained by slitting a woven glass/copper fabric, respectively.

The knitted aramid tape was prepared using a Crompton and Knowles, Model N-10 needle loom and 416 grain, woolen spun, 4" staple aramid yarn in the warp and fill. A 50/2 cc nylon catch thread was used to stabilize and tape.

The knitted tape was precoated with a phenolic cement used in Example 1. The phenolic resin precoat was 11 weight percent of the coated aramid tape, and the rubber/resin cement, after solvent removal, was 73 weight percent, based on the total weight of the precoated, cement coated knitted tape.

One hundred and fifty grams of the coated, knitted aramid tape was wound in the manner of Example 1 to form the friction element preform of a clutch facing.

The woven fabric prepared with a glass roving warp and copper wire fill was: (1) treated with the same rubber/resin cement, (2) the coated, woven fabric was slit into a ½" wide tape and (3) 275 grams of the tape were wound in the previously described undulating manner to prepare the reinforcing member for the aramid containing, friction member.

The aramid friction member preform and the glass containing reinforcing member preform were combined in the mold, precured, and cured as described in Example 1.

The resulting laminated facing was tested as described in Example 2 with the following results.

TABLE V

| Fade No. | Max. μ | Min. μ |
|---|---|---|
| 1 | .35 | .31 |
| 2 | .36 | .32 |
| 3 | .38 | .26 |

An average wear value of only 0.001" was observed during the duration of the test.

EXAMPLE 5

A multilayered clutch facing was prepared as described in Example 4 with the exception that a precoat of a heat curable, phenol formaldehyde resin was not applied to the aramid knitted tape, and the amount of rubber/resin cement applied to the aramid knitted tape was 77 weight percent, based on the total weight of knitted tape and resin/rubber cement coating.

The laminated facing thus produced was tested as described in Example 2 with the following results:

TABLE IV

| Fade No. | Max. μ | Min. μ |
| --- | --- | --- |
| 1 | .38 | .31 |
| 2 | .36 | .32 |
| 3 | .35 | .26 |

An average wear value of only 0.002" was obtained.

EXAMPLE 6

The example describes the preparation of a clutch facing having a friction member formed of a cam wound knitted, continuous filament, aramid tape and a reinforcing member comprising a cam wound glass fiber tape described in Example 4.

The knitted tape was prepared with the previously described needle loom, using 1500 denier, continuous filament, aramid yarn (Kevlar 29) in the warp and fill. A 600 denier polyester catch thread was used to stabilize the tape. This continuous filament tape was precoated with the phenolic resin and rubber/resin cement as described in Example I. The resin precoat was 10 weight percent of the coated aramid tape, and the rubber-resin cement was 75 weight percent, based on the total weight of the precoated tape.

A laminated clutch facing was prepared using the glass/copper fabric member and method of preparation described in Example 4. The cured and postcured laminated facing was tested as described in Example 2 with the following results.

TABLE VII

| Fade No. | Max. μ | Min. μ |
| --- | --- | --- |
| 1 | .33 | .22 |
| 2 | .33 | .25 |
| 3 | .33 | .27 |

An average wear of 0.004 inches was observed during the duration of the test. The hot burst strength was 9834 rpm.

EXAMPLE 7

A number of laminated clutch facings were made as described in Example 4, the friction elements thereof being prepared from thermosetting resin precoated and cement coated knitted tape of aramid yarn slit to ¼" width after precoating and coating, and the reinforcing elements being formed of a tape obtained by coating a woven glass/copper fabric with cement and cutting the fabric into ¼" strips. The reinforcing tape was coated with an aqueous base heat-curable cement containing about 70% solids and having the following composition:

TABLE VIII

| Constituent | Weight Percent (Dry Basis) |
| --- | --- |
| Carboxylated nitrile rubber | 16.51 |
| Phenol formaldehyde resin | 13.89 |
| Particulate friction modifiers | 55.49 |
| Sulfur | 14.11 |

The ¼" tapes forming the respective friction and reinforcing elements were wound into the shape of annular preforms, as follows:

TABLE IX

| Clutch Facing | Friction Element | Reinforcing Element |
| --- | --- | --- |
| A | Undulating | Undulating |
| B | Undulating | Spiral |
| C | Spiral | Spiral |
| D | Spiral | Undulating |

After molding, post-curing and grinding of the reinforcing elements to expose the rivet holes, the resulting clutch facings were tested for hot burst strength and also subjected to the Controlled Torque Test. The results obtained are set forth in Table X below:

TABLE X

| Clutch Facing | Hot Burst Strength (RPM) | |
| --- | --- | --- |
| A | 10,900 | |
| B | 10,900 | |
| C | — | |
| D | 12,000 | |

| Clutch Facing | Fade No. | Max. μ | Min. μ |
| --- | --- | --- | --- |
| A | 1 | 0.31 | 0.23 |
|   | 2 | 0.33 | 0.22 |
|   | 3 | 0.34 | 0.22 |
| B | 1 | 0.41 | 0.23 |
|   | 2 | 0.40 | 0.26 |
|   | 3 | 0.39 | 0.22 |
| C | 1 | 0.29 | 0.21 |
|   | 2 | 0.37 | 0.25 |
|   | 3 | 0.50 | 0.28 |
| D | 1 | 0.45 | 0.22 |
|   | 2 | 0.44 | 0.22 |
|   | 3 | 0.37 | 0.22 |

The average wear during the Controlled Torque Test ranged from 0.001 in. for facings B and C to 0.004 in. and 0.007 in. respectively, for facings A and D.

EXAMPLE 8

This example describes the preparation of a laminated clutch facing having a friction element of spun aramid fibers and a reinforcing element comprising a tape formed of a glass/copper fabric.

A 2/1 spun aramid yarn of approximately 5300 denier was coated with the heat-curable cement composition set forth in Table VIII of Example 7. The cement was continuously applied to the yarn by passing the yarn through a dip tank and drying the coated yarn in a drying oven maintained at 115° F. Using this procedure, a 75 weight percent pick up of dry cement, based on total weight of cement and fibers, was obtained.

A tape was formed by gathering six of the coated yarns together as they exited from the drying oven, and the tape was wound on a rotating roll.

A sufficient amount of the coated aramid fiber tape required to form a preform of the friction element of a clutch facing was wound in undulating fashion onto a revolving mandrel in such manner that the convolutions of the tape varied in the instantaneous radius at which they were wound.

A woven fabric having a glass roving warp and copper wire fill was coated with a toluene solution containing about 45 percent solids of a heat-curable cement composition having the following composition:

TABLE XI

| Constitutent | Weight Percent (Dry Basis) |
| --- | --- |
| Natural Rubber | 13.72 |
| Phenol formaldehyde resin | 7.48 |
| Particulate friction modifiers | 66.27 |
| Sulfur | 9.57 |

TABLE XI-continued

| Constitutent | Weight Percent (Dry Basis) |
|---|---|
| Accelerators, curing agents, etc. | 2.96 |

The cement pick up was 62 percent by weight based on the combined weight of cement and fabric.

The fabric was cut into ½" wide strips and wound in undulating fashion to prepare a reinforcing member preform.

The aramid friction member preform and the glass fabric reinforcing member preform were combined in a mold, precured, post cured, and the backing was ground to expose the rivet holes, as described in Example 1.

The resulting laminated facing was subjected to the Controlled Torque Test as described in Example 2 with the following results.

TABLE XII

| Fade No. | Max. $\mu$ | Min. $\mu$ |
|---|---|---|
| 1 | 0.41 | 0.24 |
| 2 | 0.41 | 0.23 |
| 3 | 0.42 | 0.23 |

The average wear was 0.000 in.

EXAMPLE 9

A clutch facing was prepared as described in Example 8 with the exception that the following aqueous base heat-curable cement containing about 70 percent solids was used to impregnate the aramid fiber tape of which the friction element was composed.

TABLE XIII

| Constitutent | Weight Percent (Dry Basis) |
|---|---|
| Carboxylated neoprene rubber | 18.72 |
| Phenol formaldehyde resin | 15.72 |
| Particulate friction modifiers | 63.76 |
| Sulfur | 1.80 |

The coefficient of friction data for this clutch facing obtained by the Controlled Torque Test described in Example 2 are set forth in Table XIV.

TABLE XIV

| Fade No. | Max. $\mu$ | Min. $\mu$ |
|---|---|---|
| 1 | 0.36 | 0.28 |
| 2 | 0.38 | 0.27 |
| 3 | 0.36 | 0.23 |

The average wear of the facing during the test was 0.009 in.

EXAMPLE 10

A clutch facing was prepared as described in Example 7 using the heat-curable cement composition of Table VIII, with the exception that a carboxylated butadiene styrene rubber was used in place of carboxylated nitrile rubber.

The coefficient of friction data for the clutch facing obtained by the Controlled Torque Test described in Example 2 are given in Table XV.

TABLE XV

| Fade No. | Max. $\mu$ | Min. $\mu$ |
|---|---|---|
| 1 | 0.46 | 0.25 |
| 2 | 0.48 | 0.25 |
| 3 | 0.52 | 0.26 |

The average wear of the facing during the test was 0.009 in.

EXAMPLE 11

A clutch facing was prepared as described in Example 7 using the heat-curable cement composition of Table VIII, with the exception that a carboxylated acrylate rubber was used in place of carboxylated nitrile rubber.

The coefficient of friction data for this clutch facing obtained by the Controlled Torque Test described in Example 2 are given in Table XV.

TABLE XVI

| Fade No. | Max. $\mu$ | Min. $\mu$ |
|---|---|---|
| 1 | 0.44 | 0.26 |
| 2 | 0.43 | 0.25 |
| 3 | 0.42 | 0.23 |

The average wear of the facing during the test was 0.007 in.

EXAMPLE 12

A laminated clutch facing was prepared as described in Example 4, using the cement of Table II to coat the knitted tape of continuous aramid fibers and the cement of Table XI to coat the glass/copper fabric tape for the reinforcing element.

The resulting clutch facing had a hot burst strength of 12,140 rpm. The clutch facing when subjected to the Controlled Torque Test produced the results set forth in Table XVII.

TABLE XVII

| Fade No. | Max. $\mu$ | Min. $\mu$ |
|---|---|---|
| 1 | 0.34 | 0.25 |
| 2 | 0.34 | 0.25 |
| 3 | 0.35 | 0.25 |

The average wear as a result of the test was 0.004 in.

What is claimed is:

1. A friction member comprising a friction element formed of aramid fibers having a decomposition temperature of at least 850° F. impregnated with a heat-curable cement and disposed in a configuration to form a first preform, and a reinforcing element comprising non-aramid fibers impregnated with a heat-curable cement and disposed in a configuration to form a second preform, said cement with which said non-aramid fibers are impregnated being compatible with that with which said aramid fibers are impregnated, said first and second preforms having been superimposed one upon the other and subjected to heat and pressure to compress said preforms, to cure said cement and to bond said preforms together to form a unitary friction member.

2. A friction member according to claim 1 in which said aramid fibers are substantially continuous filaments.

3. A friction facing according to claim 1 in which said aramid fibers are staple fibers.

4. A friction member according to claim 1 in which said first preform contains up to about 30 percent, by weight, of non-aramid fibers.

5. A friction member according to claim 1 in which the cement with which the fibers of said first and second preforms are impregnated comprises from about 20 to about 80 percent, by weight, of a thermosetting resin and from about 80 to about 20 percent of a heat-curable elastomer.

6. A friction member according to claim 5 in which said thermosetting resin is a phenol formaldehyde resin, said heat-curable elastomer is a natural rubber, and said resin and elastomer are present in substantially equal quantities in said cement.

7. A friction member according to claim 1 in which said aramid fibers have a decomposition temperature of at least about 900° F.

8. A friction member according to claim 1 in which said aramid fibers are formed of the condensation product of terephthalic acid and p-phenylenediamine, and have a decomposition temperature of about 930° F.

9. A friction member according to claim 1 having molded therein a plurality of holes extending from the exposed surface of said friction element into said reinforcing element, the exposed surface of said reinforcing element having been removed to a depth sufficient to expose said holes.

10. A friction member according to claim 1 in the form of a disc brake pad.

11. A friction member according to claim 1 in the form of a brake lining.

12. An annular friction facing comprising a friction element comprising aramid fibers having a decomposition temperature of at least 850° F. impregnated with a heat-curable cement and disposed so as to form a first annular preform, and a reinforcing element formed of non-aramid fibers impregnated with a heat-curable cement and disposed so as to form a second annular preform, said cement with which said non-aramid fibers are impregnated being compatible with that with which said tape of aramid fibers is impregnated, said first and second preforms having been superimposed one upon the other and subjected to heat and pressure to compress said preforms and to cure said cement to bond said preforms together to form an annular friction facing.

13. A friction facing according to claim 12 in which said aramid fibers are in the form of a tape comprising a plurality of yarns.

14. A friction facing according to claim 12 in which said aramid fibers are in the form of a knitted tape.

15. A friction facing according to claim 13 in which said aramid fibers are substantially continuous filaments.

16. A friction facing according to claim 13 in which said aramid fibers are staple fibers.

17. A friction facing according to claim 12 in which the cement with which the fibers of said first and second preforms are impregnated comprises from about 20 to about 80 percent, by weight, of a thermosetting resin and from about 80 to about 20 percent of a heat-curable elastomer.

18. A friction facing according to claim 17 in which said thermosetting resin is a phenol formaldehyde resin, said heat-curable elastomer is a natural rubber, and said resin and elastomer are present in said cement in substantially equal proportions.

19. A friction element according to claim 12 in which said aramid fibers have a decomposition temperature of at least about 900° F.

20. A friction facing according to claim 12 in which said aramid fibers are formed of the condensation product of terephthalic acid and p-phenylenediamine, and have a decomposition temperature of about 930° F.

21. A friction facing according to claim 12 having molded therein a plurality of holes extending from the exposed surface of said friction element into said reinforcing element, the exposed surface of said reinforcing element having been removed to a depth sufficient to expose said holes.

22. An annular friction facing comprising a friction element formed of a first tape comprising aramid fibers having a decomposition temperature of at least 850° F. impregnated with a heat-curable cement and disposed in an undulating annular fashion to form a first annular preform, and a reinforcing element formed of a second tape comprising substantially continuous glass filaments impregnated with a heat-curable cement and disposed in an undulating annular fashion to form a second annular preform, said cement with which said second tape is impregnated being compatible with that with which said first tape is impregnated, said first and second preforms having been superimposed one upon the other and subjected to heat and pressure to compress said tapes and to cure said cement to bond said preforms together to form an annular friction facing.

23. A friction facing according to claim 22 in which said first tape comprises a plurality of yarns and second tape comprises a plurality of rovings.

24. A friction facing according to claim 22 in which said first tape comprises a knitted tape.

25. A friction facing according to claim 22 in which said second tape comprises a strip of woven fabric.

26. A friction facing according to claim 23 in which said aramid fibers are substantially continuous filaments.

27. A friction facing according to claim 23 in which said aramid fibers are staple fibers.

28. A friction facing according to claim 22 in which said tape of which said first preform is composed contains up to about 30 percent, by weight, of non-aramid fibers.

29. A friction facing according to claim 22 in which said cement with which said first and second tapes are impregnated comprises from about 20 to about 80 percent, by weight, of a thermosetting resin and from about 80 to about 20 percent of a heat-curable elastomer.

30. A friction facing according to claim 8 in which said thermosetting resin is a phenol formaldehyde resin, said heat-curable elastomer is a natural rubber, and said resin and elastomer are present in said cement in substantially equal proportions.

31. A friction facing according to claim 22 in which said aramid fibers have a decomposition temperature of at least about 900° F.

32. A friction facing according to claim 22 in which said aramid fibers are formed of the condensation product of terephthalic acid and p-phenylenediamine, and have a decomposition temperature of about 930° F.

33. A friction facing according to claim 22 having molded therein a plurality of holes extending from the exposed surface of said friction element into said reinforcing element, the exposed surface of said reinforcing element having been removed to a depth sufficient to expose said holes.

34. The method of forming an annular friction facing comprising:
(A) forming a first tape comprising aramid fibers having a decomposition temperature of at least 850° F. impregnated with a heat-curable cement and disposing said tape in spiral or undulating annular fashion to form a first disc-shaped preform, (B) forming a second tape comprising substantially continuous glass filaments impregnated with a heat-curable cement and disposing said tape in spiral or undulating annular fashion to form a second disc-shaped preform, said cement with which said second tape is impregnated being compatible with that with which said first tape is impregnated, (C) superimposing said first and second preforms one upon the other and subjecting said superimposed preforms to heat and pressure to compress said tapes and to cure said cement to bond said preforms together to form a unitary disc-shaped friction facing.

35. The method according to claim 34 in which said first tape comprises a plurality of yarns and second tape comprises a plurality of rovings each impregnated with heat-curable cement.

36. The method according to claim 34 in which said first tape comprises a knitted tape.

37. The method according to claim 34 in which said second tape comprises a strip of woven fabric.

38. The method according to claim 35 in which said aramid fibers are substantially continuous filaments.

39. The method according to claim 35 in which said aramid fibers are staple fibers.

40. The method according to claim 34 in which said tape of which said first preform is composed contains up to about 30 percent, by weight, of non-aramid fibers.

41. The method according to claim 34 in which said cement with which said first and second tapes are impregnated comprises from about 20 to about 80 percent, by weight, of a thermosetting resin and from about 80 to about 20 percent of a heat-curable elastomer.

42. The method according to claim 41 in which said thermosetting resin is a phenol formaldehyde resin, said heat-curable elastomer is a natural rubber, and said resin and elastomer are present in said cement in substantially equal proportions.

43. The method of claim 34 in which said aramid fibers have a decomposition temperature of at least about 900° F.

44. The method according to claim 34 in which said aramid fibers are formed of the condensation product of terephthalic acid and p-phenylenediamine, and have a decomposition temperature of about 930° F.

45. The method of forming a disc-shaped friction facing having an inner diameter and an outer diameter for use in a clutch assembly or the like comprising the steps of:

(A) (1) impregnating a plurality of yarns comprising aramid fibers having a decomposition temperature of at least about 850° F. with a heat-curable cement;

(2) drying said cement;

(3) combining a plurality of said dry, cement-impregnated aramid fiber yarns to form a first tape; and (4) winding said first tape in undulating fashion to form a first disc-shaped preform;

(B) (1) impregnating a plurality of rovings of substantially continuous glass filaments with a heat-curable cement which is compatible with the cement with which said first tape is impregnated;

(2) drying said cement;

(3) combining a plurality of said dry cement-impregnated glass fiber rovings to form a second tape; and (4) winding said second tape in undulating fashion to form a second disc-shaped preform;

(C) (1) superimposing said first and second preforms one upon the other, and (2) subjecting said superimposed preforms to heat and pressure to compress said tapes and to cure said cement to bond said preforms together to form a unitary disc-shaped friction facing.

46. The method according to claim 45 in which said aramid fibers are substantially continuous filaments.

47. The method according to claim 45 in which said aramid fibers are staple fibers.

48. The method according to claim 45 in which said tape of which said first preform is composed contains up to about 30 percent, by weight, of non-aramid fibers.

49. The method according to claim 22 in which said cement with which said first and second tapes are impregnated comprises from about 20 to about 80 percent, by weight, of a thermosetting resin and from about 80 to about 20 percent of a heat-curable elastomer.

50. The method according to claim 49 in which said thermosetting resin is a phenol formaldehyde resin, said heat-curable elastomer is a natural rubber, and said resin and elastomer are present in said cement in substantially equal properties.

51. The method of claim 45 in which said aramid fibers have a decomposition temperature of at least about 900° F.

52. The method according to claim 22 in which said aramid fibers are formed of the condensation product of terephthalic acid and p-phenylenediamine, and have a decomposition temperature of about 930° F.

53. The method according to claim 45 in which said preforms are subjected to heat and pressure in a mold having a plurality of pins which extend through said first preform and into said second preform during the molding operation, and in which the surface of the molded disc-shaped friction facing comprising glass fibers is ground to a sufficient depth to expose the holes molded into said friction facing by means of said pins.

* * * * *

UNITED STATES PATENT AND TRADEMARK OFFICE
CERTIFICATE OF CORRECTION

PATENT NO. : 4,244,994

DATED : January 13, 1981

INVENTOR(S) : James T. Trainor and Stanley F. Covaleski

It is certified that error appears in the above-identified patent and that said Letters Patent are hereby corrected as shown below:

Column 1, line 25: "be" should read --is--;
Column 2, line 14: "hazzard" should read --hazard--;
Column 2, line 54: "laminae" should read --laminate--;
Column 2, line 59: "his" should read --this--;
Column 3, line 8: "segmens" should read --segments--;
Column 3, line 26: "the" should read --to--;
Column 4, line 3: "is" should read --are--;
Column 4, line 20: "eachother" should read --each other--;
Column 10, line 58: "madril" should read --mandril--; and
Column 20, line 39 (claim 50): "properties" should read --proportions--.

UNITED STATES PATENT AND TRADEMARK OFFICE
CERTIFICATE OF CORRECTION

PATENT NO. : 4,244,994
DATED : January 13, 1981
INVENTOR(S) : James T. Trainor and Stanley F. Covaleski It is certified that error appears in the above-identified patent and that said Letters Patent are hereby corrected as shown below:

Column 3, line 41: "exposed" should read --expose--;

Column 4, line 25: "
$$-N(R_1)-AR_1-N(R_1)-C(=O)-Ar_2-C-$$
"

should read --
$$-N(R_1)-Ar_1-N(R_1)-C(=O)-Ar_2-C-$$
--; and

Column 9, line 35: "type" should read --tape--.

Signed and Sealed this

Twenty-sixth Day of May 1981

[SEAL]

Attest:

RENE D. TEGTMEYER

Attesting Officer    Acting Commissioner of Patents and Trademarks